Feb. 16, 1965
G. E. LANGLOIS ETAL
3,170,001
POLYMERIZATION OF HYDROCARBONS
Filed Oct. 31, 1961
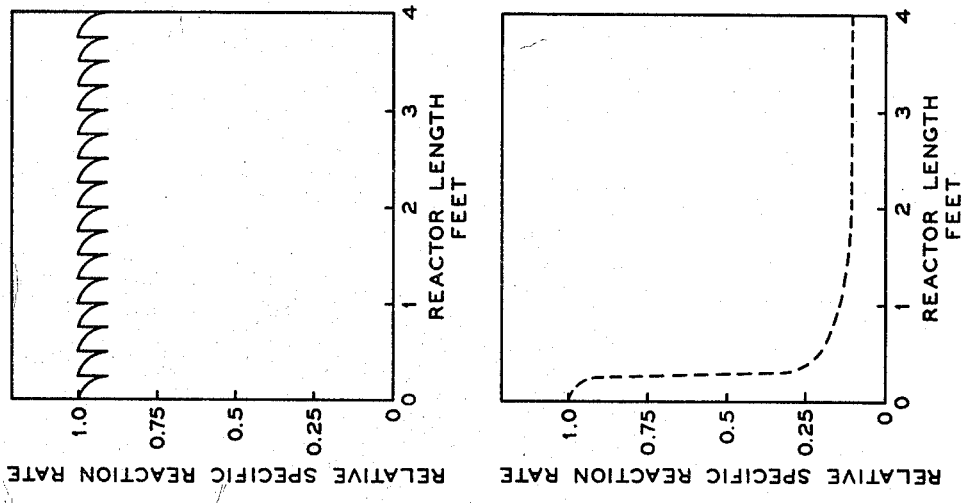
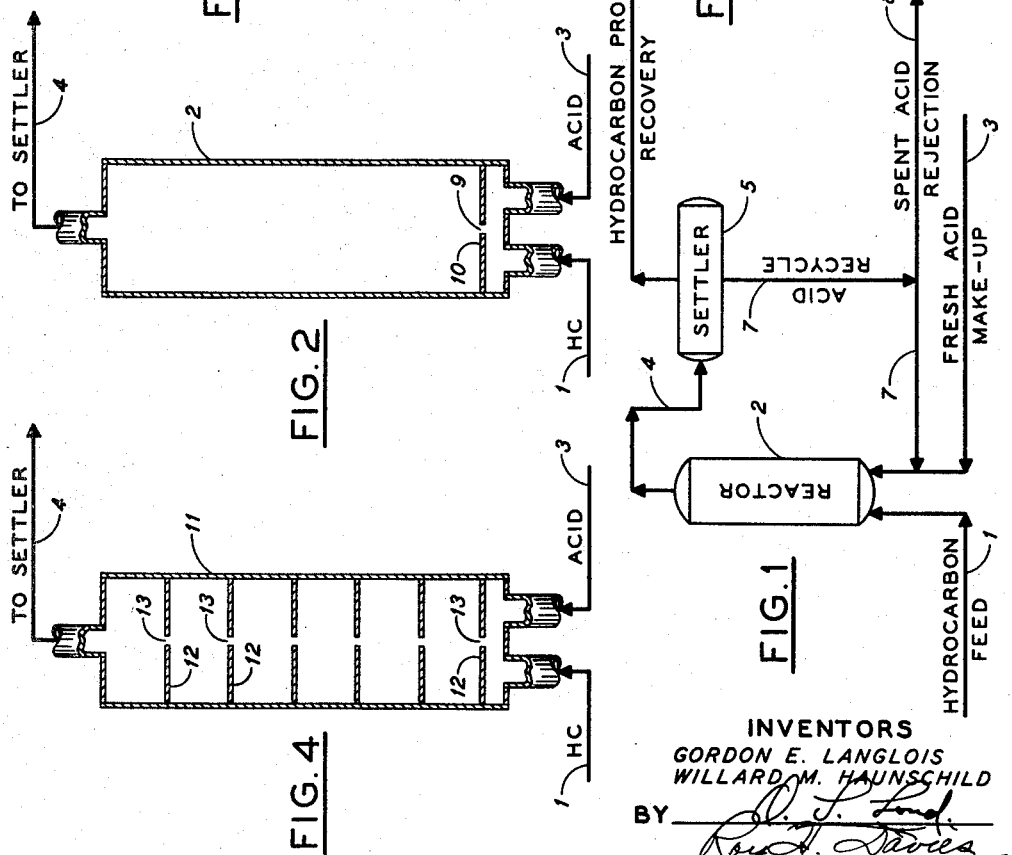
INVENTORS
GORDON E. LANGLOIS
WILLARD M. HAUNSCHILD
BY
ATTORNEYS United States Patent Office 3,170,001
Patented Feb. 16, 1965

3,170,001
POLYMERIZATION OF HYDROCARBONS
Gordon E. Langlois, El Cerrito, and Willard M. Haunschild, Walnut Creek, Calif., assignors to California Research Corporation, San Francisco, Calif., a corporation of Delaware
Filed Oct. 31, 1961, Ser. No. 150,113
1 Claim. (Cl. 260—683.15)

This application is a continuation-in-part of our co-pending and now abandoned application Serial No. 760,519, filed September 11, 1958, which in turn was a continuation-in-part of application Serial No. 594,593, filed June 28, 1956, now abandoned.

This invention relates to catalytic conversion of unsaturated hydrocarbons and more particularly to bulk liquid catalyst polymerization of normally gaseous olefin hydrocarbons to produce, for example, liquid polymers for motor fuel (motor polymer); and an object of the invention is to provide novel methods and apparatus for producing a high volatility, high octane motor polymer, and for maintaining a high reaction rate in a liquid catalyst polymerization process.

Polymerization processes using bulk liquid acid catalysts, for example, phosphoric acid, have advantages that make them commercially more desirable in many ways than polymerization processes using other types of catalysts, for example, (a) the "solid" phosphoric acid catalyst prepared by mixing phosphoric acid with kieselguhr, extruding the mixture and calcining the extrudate, (b) the "film" type catalyst consisting of a thin film of liquid acid on quartz particles, and (c) the metal pyrophosphate catalysts. These advantages of bulk liquid acid catalyst polymerization processes include the appreciably higher olefin feed rates and conversions made possible by the bulk liquid catalysts. With the advent in recent years of improved methods for combating the more serious equipment corrosion problem that exists with the use of bulk liquid acid catalysts, and that at one time was a serious deterrent to the use of commercial bulk liquid acid processes, these processes have become increasingly attractive. However, until now, there have remained other serious deterrents to impede progress in this field, in the form of at least three major problems for which heretofore no satisfactory solution has been found, viz., how to (1) counteract the drop in reaction rate as the hydrocarbon charge proceeds through a reactor, (2) increase product volatility, and therefore improve product quality, particularly in the case of motor polymer, and (3) increase the octane number of the product polymer when preparing motor polymer. It is an object of this invention to provide solutions to the foregoing problems.

While alkylation bears some similarities to polymerization, the dissimilarities are so great that reference to the alkylation art in connection with the foregoing problems has not been productive of solutions. Thus, in alkylation processes it is desired to keep the olefin concentration as low as possible to avoid polymerization, and in order to do this various expedients have been used, for example, recycle of reaction mix to dilute the fresh feed and maintain a low olefin concentration therein. It has been found that these expedients are not only ineffective to produce solutions to the aforesaid problems in polymerization processes, but operate in polymerization processes to produce deleterious results and to compound the problems. Accordingly, it has been necessary to leave the alkylation art as a source of the necessary solutions and to find other approaches to the solutions, which have now been found.

It has been found that in a catalytic polymerization process embodying a reaction zone for the polymerization of normally gaseous olefins in the presence of a bulk liquid acid catalyst, for example, phosphoric acid, significant improvements in reaction rate, product volatility, and product octane number may be obtained by the methods of the present invention, particularly in the production of motor polymer.

In accordance with the present invention, there is provided an improvement in a process for polymerizing normally gaseous olefins in the presence of a bulk liquid acid catalyst, for example phosphoric acid, to produce motor polymer which comprises passing said olefins and bulk liquid acid catalyst in concurrent flow consecutively through a series of reaction chambers, preferably at a space velocity from 0.1 to 100 v./v./hr., each chamber being operated at a temperature from 200° to 500° F. and a pressure from 200 to 1800 p.s.i.g., vigorously mixing the contents of each of said chambers, substantially preventing back-mixing of the contents of each of said chambers to any preceding chamber, withdrawing an effluent comprising a volatile motor polymer from the final chamber, and separating said motor polymer from said effluent.

Preferably, the number of separate reaction chambers or stages will be about from 4 to 150, and more preferably from 10 to 100.

The process of the present invention is operative with various olefinic feeds, for example, propylene, butenes, and mixed olefins such as propylene and butenes. While the feed may comprise other constituents, for example inert diluents, it will have a substantial olefinic content, preferably from 20 to 100 weight percent. Excellent results are obtained with a feed having a total olefinic contents of from 30 to 60 weight percent, whether as a single olefin or as mixed olefins.

While the above improved process may be carried out in any mixing chamber arrangement that will perform the desired functions, a particularly attractive and preferable method of carrying out the process is in conjunction with at least one elongated vertical reaction chamber housing having orifice plate separators disposed transversely across said housing in spaced relationship to divide said housing into the requisite number of chambers, to prevent back-mixing under the flow conditions employed, and to accomplish the desired mixing in each chamber. In this preferred embodiment, each orifice plate separator will have at least one orifice, and preferably a multiplicity of orifices, for example from 0.1 to 50 per square inch, depending upon the size of each orifice, the total pressure drop desired across the reactor housing and other factors that will be apparent to those skilled in the art after reading the description of the present invention herein. The total orifice area per plate preferably will be less than 25% of the toal plate area (including orifices), and much more preferably, it will be less than 15% of the total plate area. The orifices will provide the only communication between adjacent stages, and substantially the entire periphery of each orifice plate will be in contact with the vertical walls of the reactor housing. The height of each stage preferably will be about one to forty-eight inches, and more preferably about from two to ten inches. It is highly preferable that the hydrocarbon charge and the acid catalyst be passed successively through the various reaction chambers upwardly in concurrent flow.

The novel features of the invention are set forth with particularlity in the appended claims. The invention will best be understood, however, both as to organization and operation, and additional objects and advantages thereof will be apparent, from the following description of a specific embodiment, when read in connection with the accompanying drawings, in which:

FIG. 1 is a simplified diagrammatic illustration of an arrangement of apparatus and flow paths in an exemplary bulk liquid acid catalyst polymerization process;

FIG. 2 is a sectional view of a single stage concurrent flow orifice plate reactor;

FIG. 3 is an exemplary graphical representation of the variation in reaction rate along the length of a single stage concurrent flow orifice plate reactor of the type illustrated in FIG. 2;

FIG. 4 is a sectional view of a multistage concurrent flow orifice plate reactor;

FIG. 5 is an exemplary graphical representation of the variation in specific reaction rate along the length of a multiple stage concurrent flow orifice plate reactor of the type illustrated in FIG. 4.

Referring now to FIG. 1, there shown is an exemplary arrangement of apparatus and flow paths in which the present invention may be used. The necessary control equipment, condensers and the like have been omitted from the drawing, since the location thereof readily can be determined by those skilled in the art. The arrangement shown may be utilized in the polymerization of propylene to produce, for example, a motor fuel product. In such case, a hydrocarbon feed mixture with a substantial propylene content and a total olefinic content, for example, of about 40%, is passed through line 1 into the liquid acid catalyst reactor 2. Reactor 2 may be operated, for example, at a temperature of from about 200° to 500° F., and at a pressure of from about 200 to 1800 p.s.i.g. Fresh bulk liquid make-up catalyst may be supplied to reactor 2 through line 3 in a concentration above about 70%, calculated as orthophosphoric acid, and preferably in the range from about 95% to 116%, in amounts sufficient to maintain in the system an acid/hydrocarbon ratio which preferably is 0.2 to 15, preferably 1 to 8, volumes of acid per volume of fresh feed. Reaction mixture emerging from reactor 2 through line 4 is passed into settler 5, where acid and hydrocarbons are separated. Hydrocarbon products are withdrawn from settler 5 through line 6. Acid is recycled through line 7 to reactor 2 in a ratio of from about 0 to 15 volumes of recycle acid per volume of fresh feed, although preferably the ratio may be maintained in the narrower range of from about 1 to 8 volumes of recycle acid per volume of fresh feed. Spent acid is withdrawn through line 8. If desired, a portion of the hydrocarbons may be separated from the hydrocarbon stream flowing in line 6 and recycled back to line 1; however, this portion may be only lighter hydrocarbons and must not contain any significant amounts of polymer product.

Referring to FIGS. 2 and 3, there shown, for purposes of comparison with the present invention, are, respectively, an exemplary conventional single stage, concurrent flow, bulk liquid acid, orifice plate reactor, such as might be used in the arrangement shown in FIG. 1, and a graph indicating the variation in reaction rate as the hydrocarbon charge proceeds through such a reactor.

Referring now particularly to FIG. 2, hydrocarbons and acid entering reactor 2 through lines 1 and 3, respectively, are forced into intimate mixing contact in their passage through orifice 9 in orifice plate 10. Such an orifice plate, with either one or a plurality of orifices, provides a simple and efficient mixing means for a single stage reactor, although mixing in a single stage reactor by other means, for example, mechanical stirrers, also is possible. However, in a single stage orifice plate reactor, it has been found that the initial high reaction rate in the reaction zone area nearest the orifice plate is not maintained as the hydrocarbons proceed through the reactor away from the orifice plate. This effect is shown graphically in FIG. 3.

Referring now particularly to FIG. 3, there shown is a graph indicating that in a single stage orifice plate reactor the reaction rate is the greatest at the beginning of the travel of the hydrocarbon charge through the reactor when the charge first has been contacted with acid, and that the reaction rate drops very substantially during a small initial portion of the hydrocarbon charge travel. The graph refers to an exemplary four-foot reactor, in which the relative specific reaction rate has dropped from about 1.0 to about 0.2 during the initial six inches of the travel of the hydrocarbon charge beyond the orifice plate. The term "specific reaction rate" refers to the specific reaction rate constant in a first order rate equation. Since the specific reaction rate constant does not change when variables such as concentrations change, the term is used herein to provide a common basis for comparisons in reaction rate variations. The term "relative specific reaction rate" is the specific reaction rate constant at any point relative to the maximum value at the stage inlet. From the foregoing it will be seen that the contacting efficiency of a single-stage reactor is relatively poor because the reaction rate is not well maintained throughout the length of the reactor.

Referring now to FIG. 4, there is shown a sectional view of a preferred embodiment of a concurrent flow orifice plate reactor constructed in accordance with the present invention. It will be seen that reaction chamber 11 has been broken up into a number of stages by means of orifice plates 12, each containing at least one orifice 13, and preferably a multiplicity of orifices 13, for example from 0.1 to 50 per square inch of orifice plate. Although only six stages have been shown for simplicity, it will be appreciated from the drawings and the following discussion that the number of stages required in a given reactor under given operating conditions to maintain the reaction rate throughout the reactor at desired values will depend on various factors, including the way in which the reaction rate would vary with reactor length in the absence of multiple stages.

It has been found that by thus breaking up a reaction chamber into a sufficient number of multiple stages, the reaction rate may be maintained throughout a reactor at values substantially higher than heretofore possible, as will be seen from FIG. 5, which indicates the variation in reaction rate through an exemplary four-foot, sixteen-stage reactor. By thus maintaining a relatively high reaction rate through a reactor, the total reactor height may be substantially less than would be possible if the reactor had a single stage only, for the same total product conversion. Resulting costs savings in this expensive type of equipment can be appreciable. Further, and quite unexpectedly, it has been found that the quality of the polymer produced with a reactor that has been divided into stages is substantially improved over the product resulting from a single-stage operation. Motor polymer so produced has greater volatility and a higher octane number.

Referring now to FIG. 5, which indicates the variation in reaction rate through an exemplary four-foot, sixteen-stage reactor, the effect on reaction rate of dividing a reactor into stages may be seen. As the acid-hydrocarbon mixture passes across a given stage, the reaction rate decreases, because the greater turbulence near the orifice causes the acid and hydrocarbons to be in the most intimate contact at this point, and they are not in such intimate contact again until they are forced through the succeeding orifice. Therefore, it may be seen that the addition of such succeeding orifice plates is a means of reviving the reaction rate after it has fallen. From the figure, it may be seen that a multiplicity of reactor stages can thus maintain the reaction rate through the reactor at substantially higher values than are possible in the absence of multiple stages. As pointed out above, the number of stages that are necessary in a given installation will depend upon a number of factors, including the degree of improvement desired in reaction rate. Even two stages will produce a definite improvement in reaction rate over a single stage; however, desirably, at least four stages should be used in order to obtain substantial improvement in product quality, particularly volatility and octane number. Preferably, the number of stages in the preferred orifice plate embodiment of the present invention will be from 4 to 150, more preferably 10 to 100, and the height of each stage will be from two inches to ten inches. It will be appreciated from the foregoing that improved reaction rates and product quality similar to those obtained with a staged orifice plate reactor may also be obtained by using a staged reactor having mechanical stirrers in lieu of orifice plates to accomplish mixing, and having means to prevent back-mixing under the flow conditions used.

Example 1

The following comparative example for three different runs illustrates the use of the apparatus and process of the present invention. In each run, an identical propylene-containing feed was charged to the liquid acid polymerization reactor, and conversion was accomplished by concurrent contacting at a 1:1 acid/hydrocarbon ratio in the presence of 102% liquid $H_3PO_4$ catalyst at average reactor pressures and temperatures of 1000 p.s.i. and 375° F., respectively. The hydrocarbon feed rate and reactor size were constant in all three cases.

Feed composition for each run: Wt. percent
- Ethane ------------------------------------ 3.5
- Propane ----------------------------------- 49.6
- Propylene --------------------------------- 41.4
- Butanes ----------------------------------- 3.5
- Butenes ----------------------------------- 1.8
- Pentanes ---------------------------------- 0.1
- Pentenes ---------------------------------- 0.1

| Run No. | No. of Reactor Stages | Product 50% Point, °F. | Product 95% Point, °F. | Product End Point, °F. | Product Octane Number (F-1 Clear) | Percent Conversion |
|---|---|---|---|---|---|---|
| 1 | 1 | 340 | 510 | 544 | 88 | 50 |
| 2 | 4 | 335 | 464 | 496 | 89.2 | 71 |
| 3 | 12 | 317 | 431 | 494 | 91.6 | 91 |

Example 2

The following example illustrates the use of the apparatus and process of the present invention with a mixed olefin feed, with a 1:1 acid/hydrocarbon ratio, and average reactor pressures and temperatures of 1000 p.s.i. and 375° F., respectively, in the presence of 102% liquid $H_3PO_4$ catalyst.

Feed composition: Mol percent
- Ethane ------------------------------------ 1.6
- Propylene --------------------------------- 16.9
- Propane ----------------------------------- 31.0
- Butenes ----------------------------------- 21.9
- Butanes ----------------------------------- 36.7

| No. of Reactor Stages | Product 50% Point, °F. | Product 95% Point, °F. | Product End Point, °F. | Product Octane Number (F-1 Clear) | Percent Conversion |
|---|---|---|---|---|---|
| 25 | 284 | 430 | 447 | 96.8 | 96.3 |

From the foregoing, it may be seen that the present invention provides novel and effective methods and apparatus for improving conversions, product volatility and product octane number in polymerization processes employing bulk liquid acid catalysts.

Although the foregoing detailed description has dealt mainly with the application of the present invention to polymerization processes utilizing orifice plate reactors, other reactor systems may be used provided that they employ the multiplicity of stages discussed in connection with orifice plate reactors, that the cross-sectional area available for fluid passage between stages is below 25%, and much more preferably below 15%, of the reactor cross-sectional area, that the flow conditions selected be so related to the fluid passageway cross-sectional area that back-mixing is substantially prevented, that an adequate degree of mixing is accomplished in each stage, and that they be operated in concurrent flow. It has been found that in any type of multiple stage reaction system used to produce motor polymer, the amount of back-mixing that occurs with reasonable flow rates when the cross-sectional area available for fluid passage between stages is not below 25% of the reactor cross-sectional area prevents the production of a motor polymer having a satisfactorily high volatility.

It is an essential feature of the present invention that back-mixing between reaction stages be substantially prevented. This may be accomplished by maintaining the cross-sectional passageway area between stages within the limits disclosed herein, and by using adequate flow rates between stages. For example, in the case of the preferred multistage orifice plate reactor embodiment discussed herein, the total flow rate through orifices in each orifice plate separator should be greater than one-half foot per second in order to substantially prevent back-mixing.

Although other specific arrangements and modes of construction and operation have been described and illustrated, numerous changes could be made in those arrangements and modes without departing from the spirit of the invention, and all such changes that fall within the scope of the appended claims are intended to be embraced thereby.

We claim:

In a polymerization process wherein a hydrocarbon feed with a substantial content of olefins selected from the group consisting of propylene and butenes and mixtures thereof is contacted in a reaction vessel with a bulk liquid phosphoric acid catalyst to produce a motor polymer product, the method of increasing the relative specific reaction rate, conversion to said product, octane number of said product, and volatility of said product, which comprises:

(a) passing said feed together with said bulk liquid phosphoric acid catalyst in concurrent flow at a space velocity of from 0.1 to 100 v./v./hr. nto a first of a series of reaction chambers, thence consecutively in concurrent flow through at least three additional reaction chambers in said series, (b) maintaining the total transverse cross-sectional area of the passageways between adjacent chambers less than 15% of the cross-sectional area of said chambers, (c) maintaining the temperature in said chambers from 200° to 500° F., (d) maintaining the pressure in said chambers from 200 to 1800 p.s.i.g., (e) substantially preventing back-mixing between adjacent chambers by passing said feed and acid through said passageways at a total flow rate greater than one-half foot per second, (f) withdrawing an effluent containing said motor polymer product from the final reaction chamber, (g) separating said motor polymer product from said effluent, and (h) recycling a portion of the remaining effluent which is substantially free of all polymer product so that said polymer product is substantially prevented from returning by external recycle to any of said chambers.

References Cited in the file of this patent

UNITED STATES PATENTS

| 2,232,674 | Pyzel | Feb. 18, 1941 |
| 2,412,863 | Bolinger et al. | Dec. 17, 1946 |
| 2,433,944 | Draeger et al. | Jan. 6, 1948 |
| 2,592,428 | Kemp et al. | Apr. 8, 1952 |
| 2,681,374 | Bethea | June 15, 1954 |